United States Patent [19]
Rohrbach et al.

[11] Patent Number: 5,704,966
[45] Date of Patent: Jan. 6, 1998

[54] METHOD AND APPARATUS FOR THE CONTINUOUS CAPTURING AND REMOVAL OF GAS MOLECULES

[75] Inventors: Ronald P. Rohrbach, Flemington, N.J.; Gordon W. Jones, Toledo, Ohio; Peter D. Unger, Convent Station; Daniel E. Bause, Flanders, both of N.J.

[73] Assignee: AlliedSignal Inc., Morristown, N.J.

[21] Appl. No.: 666,853

[22] Filed: Jun. 19, 1996

Related U.S. Application Data

[63] Continuation-in-part of Ser. No. 363,500, Dec. 23, 1994, abandoned.

[51] Int. Cl.$^6$ .................. B01D 47/02; B01D 47/14
[52] U.S. Cl. .................. 95/170; 55/234; 95/211; 95/212; 261/104; 261/107; 428/398
[58] Field of Search .................. 261/104, 107, 261/DIG. 17, DIG. 65; 55/233, 234, 302, 303, 223; 95/210, 211, 212, 159, 170, 171; 428/397, 398; 96/181

[56] References Cited

U.S. PATENT DOCUMENTS

| | | | |
|---|---|---|---|
| 2,653,017 | 9/1953 | Frost | 261/104 |
| 3,505,175 | 4/1970 | Zalles | 261/80 X |
| 3,754,377 | 8/1973 | Clonts | 55/233 X |
| 3,991,724 | 11/1976 | Geiser | 261/99 X |
| 4,031,180 | 6/1977 | Bohanon | 261/106 |
| 4,098,852 | 7/1978 | Christen et al. | 261/104 |
| 4,166,087 | 8/1979 | Cline et al. | 261/DIG. 17 |
| 4,300,925 | 11/1981 | Nikandrov et al. | 55/242 |
| 4,323,373 | 4/1982 | Fritz | 55/242 X |
| 4,774,032 | 9/1988 | Coates et al. | 261/104 |
| 4,938,787 | 7/1990 | Simmerlein-Erlbacher | 55/233 |
| 4,976,113 | 12/1990 | Gershuni et al. | 261/104 X |
| 5,024,686 | 6/1991 | Lerner | 55/259 |
| 5,057,368 | 10/1991 | Largman et al. | 428/397 |
| 5,110,325 | 5/1992 | Lerner | 55/90 |
| 5,310,416 | 5/1994 | Börger et al. | 95/64 |
| 5,318,731 | 6/1994 | Yokoya et al. | 261/104 |
| 5,472,613 | 12/1995 | Schofield | 210/634 |

FOREIGN PATENT DOCUMENTS 0 600 331 A1  6/1994  European Pat. Off.

*Primary Examiner*—Richard L. Chiesa
*Attorney, Agent, or Firm*—Howard G. Massung

[57] ABSTRACT

A unique filtration method and device (10) which continuously removes several gas phase contaminants from an air stream through the use of partially hollow wicking fibers (20) impregnated with a selected liquid which can capture the gas phase contaminants. The wicking fibers (20) are generally disposed parallel and are formed into a filter element (12) which extends from the air stream to be cleaned into another air stream which can strip and carry away the unwanted gas phase contaminants. The gas phase contaminants are conveyed to the stripping air stream by a concentration factor induced molecular migration. The air stream to be cleaned is directed through a compartment (16) across which the filter element (12) extends so the complete air flow is through filter element (12). Filter element (12) also extends into another compartment (18) through which the stripping air stream flows. The wicking fibers (20) include internal longitudinal cavities (22) each with a relatively small longitudinal extending opening (24). The wicking fibers (20) are filled with the selected contaminant removing liquid through capillary action by which the individual wicking fibers (20) rapidly draw the selected liquid, with which they come into contact, through the internal cavities (22). The absorption liquid remains within the wicking fiber cavities (22) and generally does not enter the space between the wicking fibers yet through the longitudinal openings (24) the liquid is in full communication with the air stream flowing past the fibers (20).

11 Claims, 5 Drawing Sheets

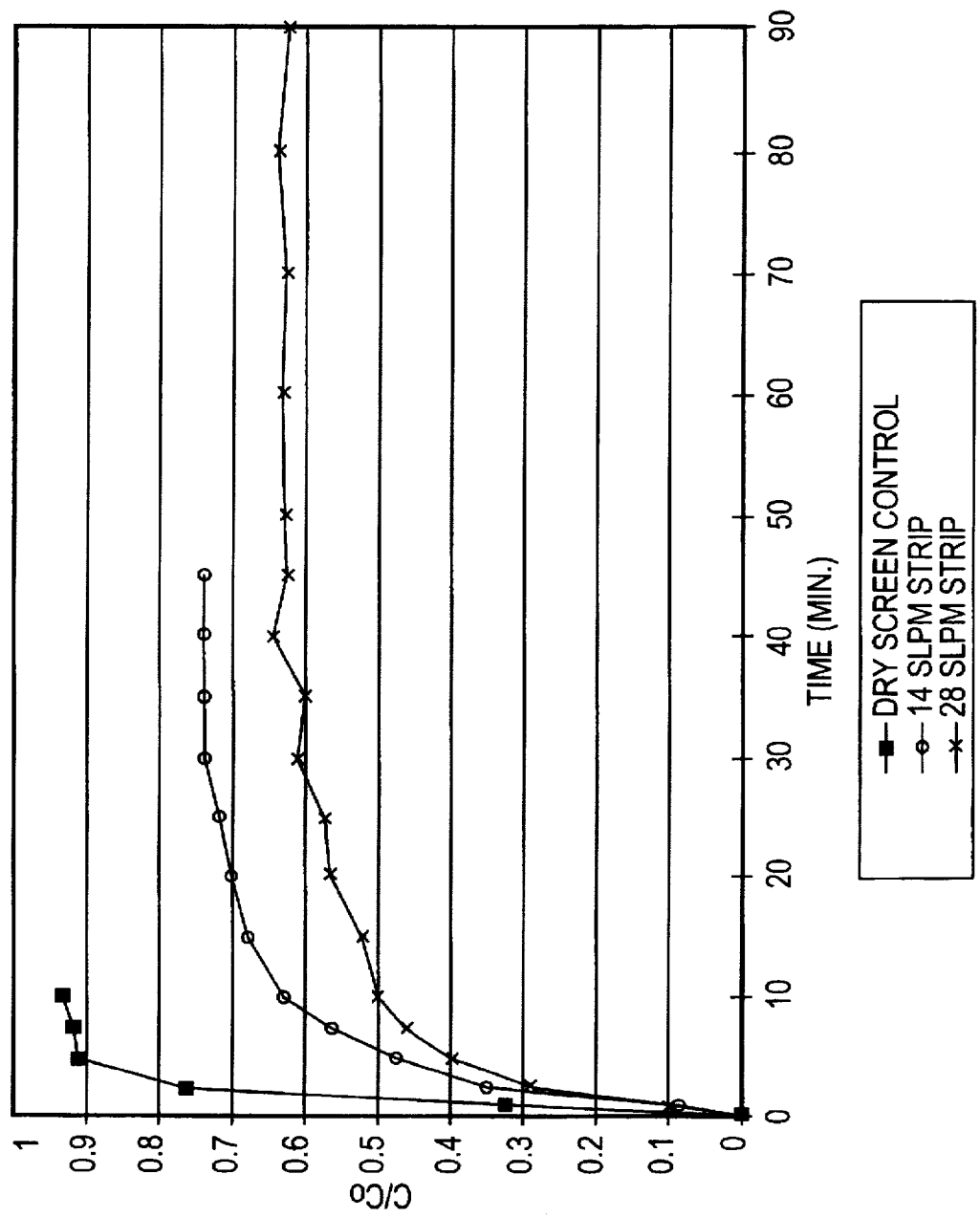

METHOD AND APPARATUS FOR THE CONTINUOUS CAPTURING AND REMOVAL OF GAS MOLECULES

CROSS-REFERENCES TO RELATED APPLICATIONS

This application is a continuation-in-part of U.S. patent application Ser. No. 08/363,500 titled "A Filtration Device Using Absorption for the Removal of Gas Phase Contamination" filed Dec. 23, 1994, now abandoned and assigned to the assignee of the present application.

BACKGROUND OF THE INVENTION

1. Field of the Invention

This invention relates to an air cleaning system and more particularly to a system for continuously removing odors or humidity from an air stream.

2. Description of Prior Art

Intake air filters, commonly encountered in conjunction with internal combustion engines, and removable air filters used in forced air home heating systems are exemplary of the particle filtering prior art. These filters use a somewhat porous paper filter element or similar filter media on which undesirable particles are retained as air is passed through the filter media. These prior art filtering systems rely on mechanical entrapment or electrical attraction, which is a surface phenomenon wherein the removed particles adhere to the surface of the filter media, and are not suitable for the removal of odors or humidity from an air stream.

An example of an adsorptive technique for the removal of odors is the use of activated charcoal or a zeolite material as an odor removing element in a device to purify an air stream. However, such adsorptive techniques of purifying an air stream are effective only for a relatively short time period, are relatively inefficient at low odor concentration levels, and frequently result in a relatively high pressure differential across the filter element. As a result relatively large quantities of filter media are required in such devices, however, the relatively large pressure differential problem would still remain. These prior devices are usually operated mechanical on a cyclic bases.

A costly and complex solution to the flow rate and efficiency problems can be provided by using absorption techniques wherein a counterflowing liquid and gas are intermingled in a gas absorption tower with certain gas components being absorbed and removed by the liquid. Such scrubbing techniques are not suited to small solid filter applications.

It is desirable to provide a compact, economical air filter for the continuous removal of odors and humidity which avoids the problems of reduced flow rates and reduced removal efficiency over time.

SUMMARY OF THE INVENTION

The present invention provides a unique filtration device which continuously removes several gas phase contaminants from an air stream through the use of a wicking fiber material containing a selected liquid, which can capture the gas phase contaminants, and which extends from the air stream to be cleaned into another air stream which can strip and carry away the unwanted gas phase contaminants. Wicking fibers have the ability to carry a liquid along their surface and to retain the liquid so it is not easily dislodged. Wicking fibers such as those disclosed in U.S. Pat. No. 5,057,368 are very small and well suited to the practice of the present invention. These generally hollow wicking fibers include internal longitudinal cavities each with a relatively small longitudinal opening extending to their outer surface. Through capillary action the individual wicking fibers rapidly draw the selected liquid, with which it comes into contact, through the internal cavities. The absorption liquid remains within the wicking fiber cavities and generally does not enter the space between the wicking fibers yet through the longitudinal openings the liquid is in communication with the air stream flowing past the wicking fibers.

Undesirable gas molecules are removed from the air stream by interposing a plurality of the wicking fibers which include in their internal cavities a liquid having an affinity for the undesired molecules. The longitudinally extending opens in the wicking fibers permits the liquid retained in the wicking fiber cavities to interact with the gas molecules within the air stream so as to absorb the unwanted gas molecules. A concentration factor induced molecular migration effectively conveys the undesirable gas molecules within the liquid away from the air stream to be cleaned and into the stripping air stream, setting up a steady state concentration gradient with new gas molecules continuously being absorbed and transported to the stripper side where they are continuously stripped off.

The wicking fibers containing the selected liquid are disposed in a first chamber through which the air stream to be cleaned is channeled and extend into a second chamber through which the air stream to carry away the gas contaminates is channeled. Preferably a generally parallel format of these fibers is constructed so that part of the fiber mat transverses both chambers of the mechanical contactor/stripper device. The mechanical housing for the wicking fiber mat accomplishes two functions, (a) it allows the incoming gas stream in need of purification to come into intimate contact with the absorption liquid in the impregnated wicking fiber media and (b) the second side allows for a warm stripping gas to regenerate the liquid in the wicking fibers cavities by removing the gas contaminates. During operation, these wicking fibers allow the liquid phase to shuttle between both chambers of the mechanical housing picking up gas molecules and transporting them to the stripping chamber side and releasing the molecules into the cleansing fluid. The present invention is particularly suitable for use in a vehicle cabin or a building air filtration system.

This invention can be use in a customized fashion to control humidity, remove toxic and unwanted gases and to purify various gases. Since this filter does not rely on adsorption, wherein the particles to be removed attach to the surface of the filter material elements, but rather absorption, molecular motion mobility can be harnessed to move unwanted gases from one zone to another in a nonmechanical manner. In the disclosed device the open space between the wicking fibers remain so that, in the air stream to be cleaned, the pressure differential problem is minimized and air flow restrictions are not increased by continuous use of the liquid and the gas molecules which are absorbed. A device according to the present invention provides for nonmechanical and continuous noncyclic regeneration or cleaning of a gas stream.

BRIEF DESCRIPTION OF DRAWINGS

For a better understanding of the invention reference may be had to the preferred embodiments exemplary of the inventions shown in the accompanying drawings in which:

FIG. 5 is a graph showing the results of using the invention for continuously removing toluene molecules from an air stream; and, FIG. 6 is an enlarged view of a C-shaped wicking fiber.

DETAILED DESCRIPTION OF THE PREFERRED EMBODIMENTS

Figure 1:
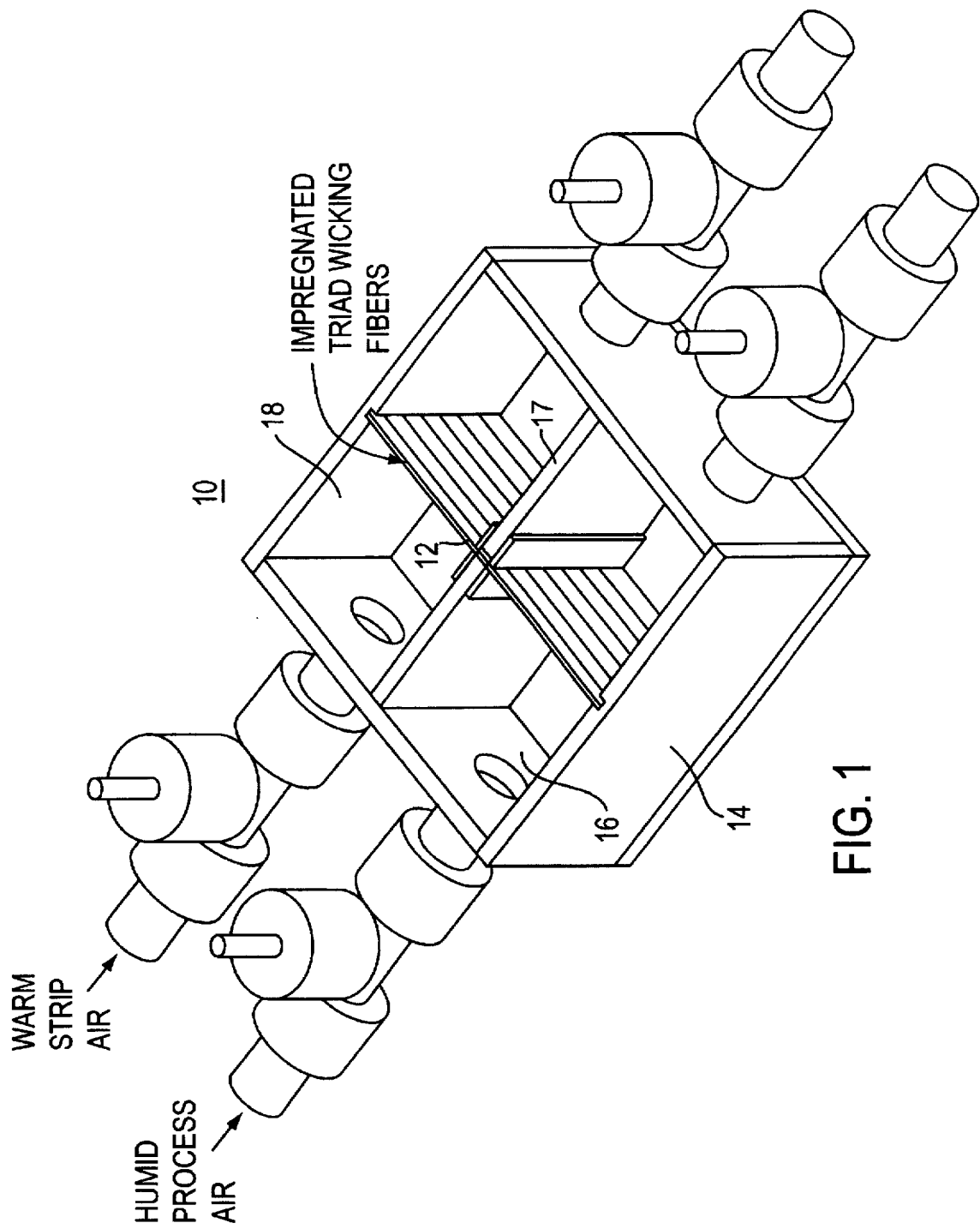
FIG. 1 is a diagrammatic perspective illustration of a gas phase removal device according to the present invention.
Figure 2:
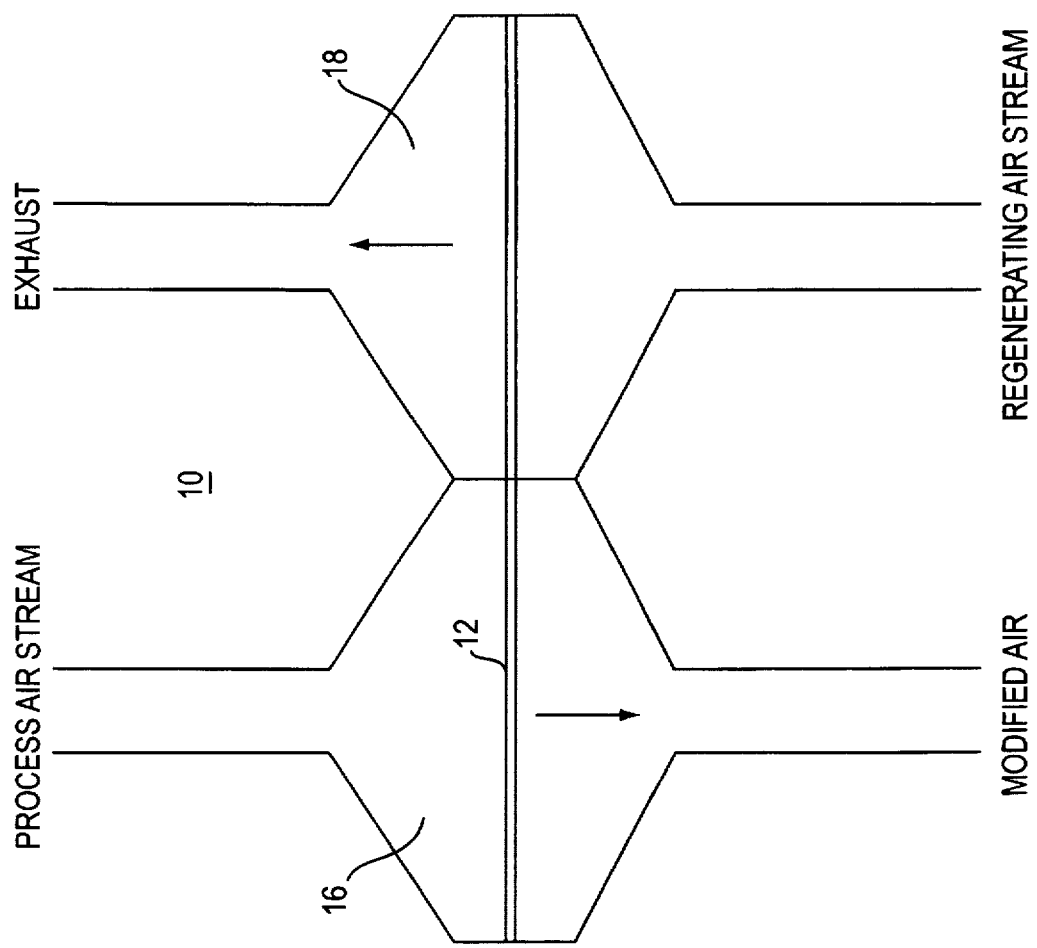
FIG. 2 is a diagrammatic view of a gas molecule filtering device according to the present invention.
Figure 3:
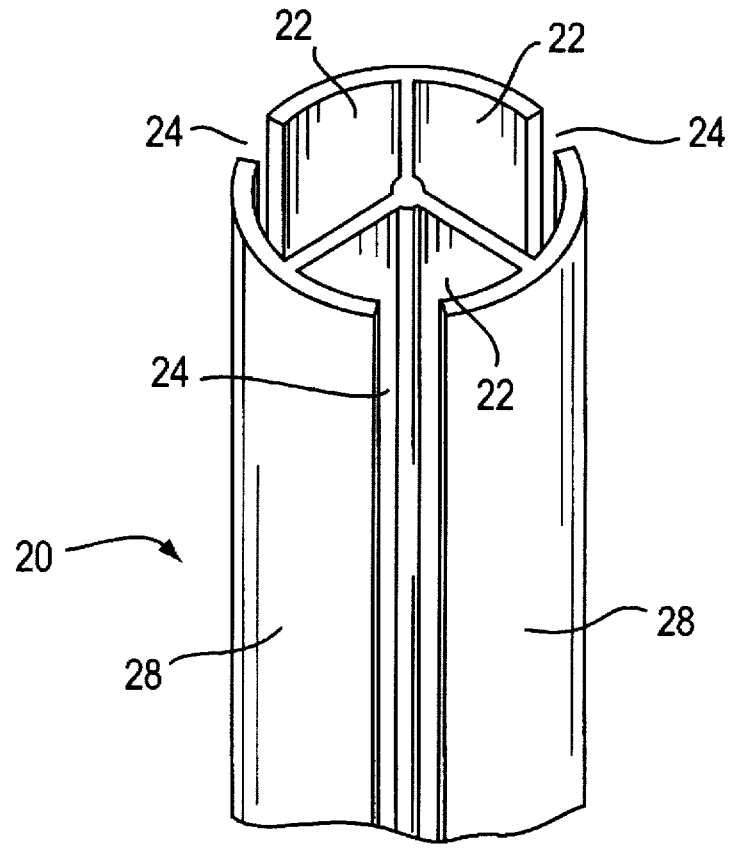
FIG. 3 is an enlarged view of a wicking fiber which is particularly suitable for practicing the present invention.

Referring now to the drawings and FIGS. 1 and 2 in particular there is shown a continuous gas molecule capturing and removal system 10 according to the present invention. Gas removal system 10 utilizes a filter element 12 formed from numerous wicking fibers 20, as shown in FIG. 3, containing a gas molecule absorbing liquid. Filter element 12 extends from an air stream to be cleaned into another air stream which can strip and remove some of the contaminating gas molecules from the absorbing liquid.

The gas absorbing liquid typically consists of an inert solvent with various additives dissolved therein. The additives are added to the inert solvent to enhance the solubilization of various vapors. The inert carrier preferably is a non volatile liquid such as glycerol, polyethylene glycol, polypropylene, mineral oil, water or any other high boiling point liquid. The gas absorbing liquid which has an affinity for the undesired air-borne gases are selected and disposed within internal channels or cavities 22 formed in the individual wicking fibers 20. The liquid media selected uses absorption rather than adsorption as its mechanism to decontaminate or purify the air stream. The absorption liquids used are selected to absorb the vapors of interest, to be non hazardous and to neutralize specific gases and odor vapors. To assist in this absorption various assitives can be used in conjunction with liquid carrier in order to facilitate absorption particular gases, i.e. lithium chloride or calcium chloride for water vapor removal or paracyclaphanes for removal of voltile organic compounds. The possible combinations of liquid carriers and absorption assisting agents are nearly unlimited as is well known to those skilled in the art. The liquid carrier selected should be capable of lightly absorbing a particular gas molecule in a reversible manner so that it can be easily stripped off.

A wicking fiber which is particularly suitable for practicing this invention is disclosed in U.S. Pat. No. 5,057,368. This patent discloses a trilobal or quadrilobal fiber formed from thermoplastic polymers wherein the fiber has a cross-section with a central core and three or four T-shaped lobes 26. The legs of the lobes intersect at the core so that the angle between the legs of adjacent lobes is from about 80 degrees to 130 degrees. The thermoplastic polymer is typically a nylon, a polyester, a polyolefin or a combination thereof. The wicking fiber as illustrated in FIG. 3 is formed as an extruded strand having three hollow interior longitudinally extending cavities 22 each of which communicates with the outer strand surface by way of longitudinal extending slots 24. The wicking fibers 20 are relatively small having a diameter of 30 to 250 microns. The capillary forces within the individual cavities 22 are so much greater than those external to the fiber 20 that the absorptive liquid is readily wicked up the interior of the fiber 20 without appreciable wetting of the external surfaces 28 or filling the inter fiber voids. The fibers 20 strongly retain the liquid through capillary action so that the fiber mat 12 is not wet to the touch and the liquid will not shake off. In a filter mat 12 of such wicking fibers 20 the area between the individual strands remains relatively free of the gas absorbing liquid with which the internal cavities 22 of each fiber 20 are filled. The filter element may be made of one or more types of wicking material strands such as nylon, polyester, or polyolefins. The three T-Shaped cross-section segments may have their outer surface 28 curved, as shown, or straight. While the wicking fiber 20 is depicted as three lobed other number of lobes are suitable. In addition other external or internal wicking fibers with C-shaped or other cross sections may also be suitable for wicking the gas absorbing liquid.

Figure 6:
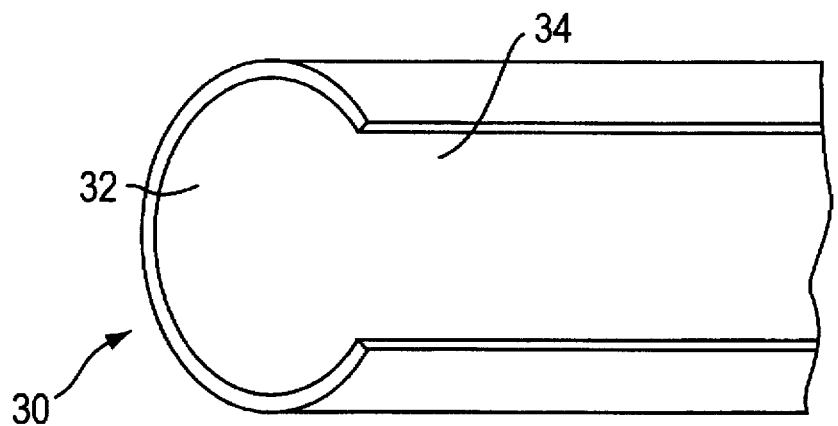

FIG. 6 shows an enlarged view of a C-shaped wicking fiber 30 with a channel 32 and a longitudinal extending opening 34. The size of the opening 34 relative to the circumference of the fiber 30 is not critical provided the selected fibers have the desired wicking properties. The specific shape of the wicking fibers is not important so long as the fibers selected can move the absorption liquid, with which it comes into contact, along its surface and then hold the absorption liquid to its surface so that it is not easily displaced.

Many common materials which are effective wicking agents may restrict circulation of air through the material. For example, wetting a common handkerchief with water essentially seals the material against air flow there through. By using internal wicking fibers where the gas absorbing liquid is maintained within the cavities 22 of fiber 20 unrestricted air flow about the outside of the individual wicking fibers 20 is maintained.

The disclosed gas removal system 10 includes a gas removal or absorption chamber 16 and a stripping chamber 18 formed within a housing 14. The fiber mesh or filter element 12 consists of numerous wicking fibers 20 disposed generally parallel and oriented to extend within both chambers 16, 18. The housing 14 defines the outside of the device 10. In FIG. 1, for clarity, the top of the housing 14 is not shown. Housing 14 is constructed so that the two chambers 16, 18 are separate. A partition 17 within housing 10 separates chamber 16 from chamber 18. The air stream to be cleaned enters chamber 16 and is directed through the portion of the impregnated fiber mesh 12 which is disposed across chamber 16. All air flowing through chamber 16 must flow through the wicking fiber mesh 12. Fiber mesh 12 is constructed with many impregnated wicking fibers 20 and has sufficient thickness so that the entire air stream flowing through chamber 16 comes into intimate contact with the selected liquid within the cavities 22 of the wicking fibers 20. The selected liquid which has an affinity for the undesired gas molecules absorbs the gas molecules and thus removes them from the air stream through chamber 16.

The wicking fibers 20, containing the liquid with the absorbed unwanted gas molecules, extend into a stripping chamber 18 wherein an air stream passes over the wicking fibers 20 and strips away and carries to an exhaust the unwanted gas molecules. A concentration factor induced molecular migration effectively conveys the undesirable gas molecules within the liquid from the air stream to be cleaned within chamber 16 into the stripping air stream through chamber 18. The stripping air stream may be heated or otherwise modified to facilitate removal of the undesirable gas molecules. The direction of flow of the air streams, which is shown different in FIGS. 1 and 2, is not important. The size of chambers 16 and 18 and the flow rates of the air streams can be designed to suit a particular application. The selected liquid acts as a shuttling carrier capable of transporting gases across the partition 17 to the stripping chamber 18 and returning again via the generally parallel arrangement of fibers 20.

Figure 4:
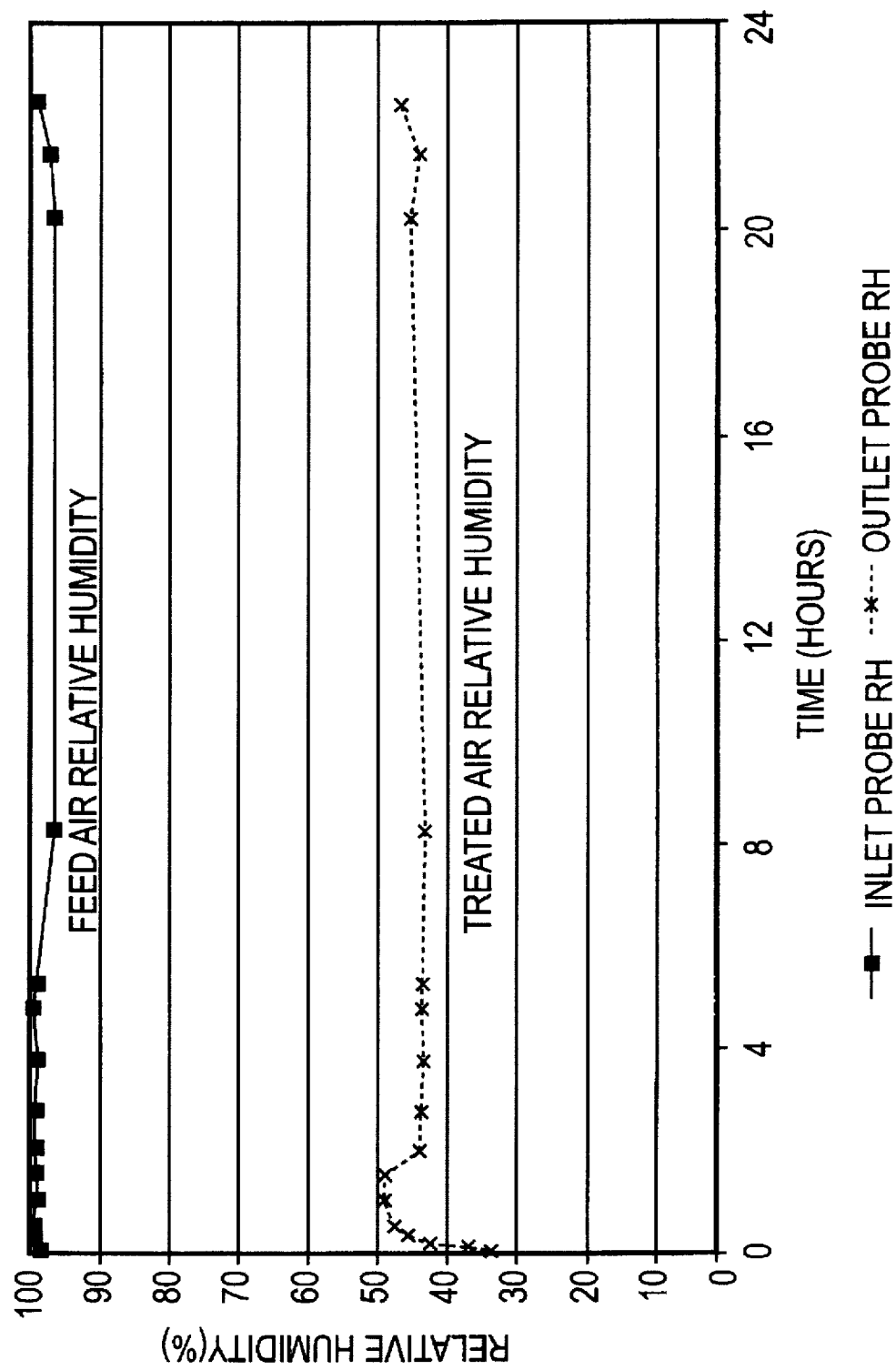
FIG. 4 is a graph showing the results of using the invention for continuous dehumidification of an air stream.

The disclosed gas molecule removal device can be used to remove water molecules from an air stream and to thus dehumidify the air. Referring now to the graphs shown in FIG. 4 supply air with a relative humidity approaching 100% has the humidity lowered to less than 50% after being treated according to the invention. The process air used in the experiment was 5 SLPM at a temperature of 25° C. The stripping air flow rate was 28 SLPM at a temperature of 42° to 46° C. The selected gas absorptive liquid phase consisted of a mixture of lithium chloride, water and propylene glycol (3.5/3.5/3 W/W/W).

The disclosed gas molecule system can also be used to continuously remove toluene molecules from an air stream. Referring now to FIG. 5 the graphs show toluene uptake by a mineral oil absorbent at two different stripping flow rates 14 SLPM and 28 SLPM. The experiment was conducted at an ambient air temperature of 22° to 24° C., using a toluene challenge level of 100 ppm. Minimal toluene uptake was observed in an experiment in which a dry unimpregnated fiber screen containing no absorbent was used. In this series of experiments, the residence time of gas within the wicking fiber layer was about 60 msec.

The method of operation and the apparatus of this invention should now be clear. Undesirable air borne material and gas contaminants are removed from an air stream by interposing a plurality of at least partially hollow wicking fibers 20 in the air stream. The hollow portions 22 of the wicking fibers contain a liquid, including a component having an affinity for the undesirable material or gas, which communicates with the air stream through an opening 24. The undesirable material or gas is absorbed by the liquid within the wicking fibers 20. The undesirable material or gas in solution within the liquid is then conveyed from the cleaned air stream by a concentration factor induced molecular migration into an exhaust air stream which strips and carries away the undesirable material or gas molecules.

The wicking fiber approach of the present invention has significant advantages over the use of activated charcoal or carbon. The impregnated wicking fibers 20 can have an extremely high odor absorbing capacity, many times greater than an equivalent carbon volume. The pressure drop across an air filter 10 is much smaller than the drop across a carbon filter for the same capacity and removal efficiency. The wicking fiber filter 10 can be impregnated with liquids to remove a broader range of gases than virgin carbon. Further, the wicking fiber filter system 10 will not off-gas like carbon. The wicking fiber systems 10, operating in a steady state condition, provides for the continuous removal of selected vapors and does not require a pump or other device to move the gas absorbing liquid.

The present invention is particularly suited to freshening air of a relatively small area such as the cockpit of an aircraft, interior of an automobile, spacecraft, submarine, building or similar enclosed environment all of which are herein generically identified as a cabin. The disclosed invention provides a compact, economical air filter 10 for the nonmechanical, noncyclic, continuous removal of cabin odors and humidity which avoids the problems of reduced air flow rates and decreased molecule removal efficiency.

We claim:

1. A device for continuously removing undesirable gas molecules from a first air stream and releasing them into a second air stream comprising:

a plurality of wicking fibers each including a longitudinally extending channel with a longitudinally extending opening;

a liquid having an affinity for the undesirable gas molecules disposed within the channels of said plurality of wicking fibers;

means for directing the first air stream across a part of said plurality of wicking fibers into contact with said liquid along said longitudinally extending openings whereby said liquid absorbs the undesirable gas molecules; and, said plurality of wicking fibers disposed to extend from the first air stream into the second air stream which strips and carries away the undesirable gas molecules.

2. A device as claimed in claim 1 comprising:

a housing through which the first air stream and the second air stream are directed;

a partition within said housing to separate the first air stream from the second air stream; and, said plurality of wicking fibers extending through said partition to span the first air stream and the second air stream.

3. A device as claimed in claim 2 wherein the gas molecules to be removed are water.

4. A device as claimed in claim 1 wherein each of said plurality fibers is generally hollow.

5. A filtration device for removing vapor molecules which cause odors from an air stream comprising:

a housing having a first chamber and a second chamber;

an air flow path through the first chamber of said housing for the air stream;

a fibrous wicking material having a plurality of strands which are disposed in the first chamber to intercept the air flow path and which extend into the second chamber;

said plurality of strands each having a hollow internal region connected to an outer surface through at least one longitudinally extending opening;

an air borne vapor absorbing liquid disposed in the hollow internal regions of said plurality of strands and communicating through said longitudinally extending openings in said plurality of strands with the air stream following the air flow path through the first chamber;

means for directing said air stream into contact with said air borne vapor absorbing liquid along said longitudinally extending openings whereby said air borne vapor absorbing liquid absorbs odor causing vapors molecules through said longitudinally extending openings; and, a stripping air stream directed through the second chamber of said housing to pass through the portion of said fibrous wicking material extending into the second chamber to strip vapor molecules absorbed by said air borne vapor absorbing liquid.

6. A filtration device as claimed in claim 5 comprising:

means for moving said air stream along said flow path;

said air borne vapor being in communication with said air borne vapor absorbing liquid in the hollow regions of said strands by passing through the longitudinally extending openings of said strands such that the air borne vapor is absorbed by said air borne vapor absorbing liquid to remove odors from the air stream without any substantial build up of the air borne vapor on the outer surface of said strands and as a result movement of the air stream is not essentially affected even after said fibrous wicking material has been in use for an extended period of time.

7. A filtration device as claimed in claim 6 wherein said strands comprise a plurality of generally elongated fibers oriented to extend across the first chamber and the second chamber of said housing.

8. A filtration device as claimed in claim 6 wherein the longitudinally extending opening of each of said strands is such that capillary forces acting on said vapor absorbing liquid retained in each of the said strands prevents the vapor absorbing liquid from leaking from said hollow region of said strand to the outer surface of said strand.

9. A filtration device as claimed in claim 8 wherein the longitudinally extending opening of each of said strands has a sufficient area to permit the vapor absorbing liquid to absorb the odor vapor in the air stream even as the capillary forces prevent wetting the outer surface of said strands.

10. A method for continuously removing a specific type of gas molecules from a first gas stream comprising the steps of:

a. selecting a liquid which has an affinity for the specific type of gas molecules to be removed;

b. placing the selected liquid on a mat formed from a plurality of wicking fibers which have the ability to move the selected liquid along their surface yet retain the selected liquid within longitudinally extending channels having longitudinally extending openings against moving into the space between the individual wicking fibers;

c. directing the first gas stream through a portion of the mat into contact with the selected liquid along the longitudinally extending openings whereby the selected liquid absorbs the specific type of gas molecules;

d. directing a second gas stream through a different portion of the mat so that the specific type of gas molecules, which have been absorbed by and disbursed through out the selected liquid, are stripped and carried away.

11. The method as claimed in claim 10 wherein the specific type of gas molecules are water and the first and second gas stream are air.

* * * * *